US012782240B2

(12) United States Patent
Li et al.

(10) Patent No.: US 12,782,240 B2
(45) Date of Patent: Nov. 3, 2026

(54) DYNAMIC PENDULUM THRUST MEASUREMENT SYSTEM AND METHOD

(71) Applicant: NATIONAL CHENG KUNG UNIVERSITY, Tainan City (TW)

(72) Inventors: Yueh-Heng Li, Tainan City (TW); Hsun-Chen Hsieh, Tainan City (TW); Chao-Wei Huang, Tainan City (TW); Ping-Han Huang, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 217 days.

(21) Appl. No.: 18/932,135

(22) Filed: Oct. 30, 2024

(65) Prior Publication Data

US 2026/0104324 A1 Apr. 16, 2026

Related U.S. Application Data

(60) Provisional application No. 63/707,103, filed on Oct. 14, 2024.

(30) Foreign Application Priority Data

Oct. 14, 2024 (TW) ................................ 113138988

(51) Int. Cl.
*G01M 99/00* (2011.01)
*F03H 1/00* (2006.01)

(52) U.S. Cl.
CPC .......... *G01M 99/00* (2013.01); *F03H 1/0081* (2013.01)

(58) Field of Classification Search
CPC ....... G01M 99/00; F03H 1/0081; G01L 5/133
See application file for complete search history.

(56) References Cited

U.S. PATENT DOCUMENTS

| | | | | |
|---|---|---|---|---|
| 2004/0182131 A1* | 9/2004 | Pringle | .................... | G01N 3/04<br>73/12.09 |
| 2019/0072155 A1* | 3/2019 | Guttman | ................ | F16D 21/00 |
| 2019/0107464 A1* | 4/2019 | Samadi | ............... | G01M 17/027 |

FOREIGN PATENT DOCUMENTS

CN 209586929 U * 11/2019

OTHER PUBLICATIONS

Thrust Stand for Electric Propulsion Performance Evaluation.

(Continued)

*Primary Examiner* — Francis C Gray

(57) ABSTRACT

A dynamic pendulum thrust measurement system and a method are disclosed to measure a thrust provided by a thruster. The system provides a swing arm, a driving device and a data capturing device. The thruster is disposed on a swing end of the swing arm to form a pendulum structure. The driving device causes the pendulum structure to perform a reciprocating swing process in a non-thrust set swing step and a thrust set swing step respectively. In the thrust set swing step, the thruster is started to provide the thrust when the pendulum structure is provided with a potential energy and/or a kinetic energy. The data capturing device is used for obtaining a thrustless-assisted swing datum of the pendulum structure when performing a thrustless-assisted pendulum motion and a thrust-assisted swing datum of the pendulum structure when performing a thrust-assisted pendulum motion to calculate the thrust provided by the thruster.

16 Claims, 15 Drawing Sheets

(56) References Cited

OTHER PUBLICATIONS

Development of BUSTLab Thrust Stand for mili-Newton Level Thrust Measurements of Electric Propulsion Systems.

Development of a counterbalanced pendulum thrust stand for electric propulsion.

* cited by examiner

DYNAMIC PENDULUM THRUST MEASUREMENT SYSTEM AND METHOD

CROSS-REFERENCE TO RELATED APPLICATION

This application claims priority to U.S. Provisional Patent Application No. 63/707,103, filed on Oct. 14, 2024; and claims priority from Taiwan Patent Application No. 113138988, filed on Oct. 14, 2024, each of which is hereby incorporated herein by reference in its entireties.

BACKGROUND OF THE DISCLOSURE

1. Field of Disclosure

The disclosure relates to a measurement system and a method, and more particularly to a dynamic pendulum thrust measurement system and a method thereof.

2. Related Art

The pulsed plasma thruster is a thruster design that uses intermittent discharges to generate thrust and is widely used in micro-satellite propulsion systems due to its high efficiency and low power consumption. However, conventional thrust measurement system for pulsed thruster has three major drawbacks that limit their widespread application: inability to accurately measure small thrusts, complex measurement system design and difficult calibration, and excessive bulkiness. The inability to accurately measure the thrust of the thruster can prevent researchers from accurately predicting satellite orbit changes, potentially leading to mission failure. Complex measurement system results in high equipment costs, and difficult-to-calibrate systems increase experimental errors. Since pulsed thruster must operate in a vacuum environment, the thrust measurement system must be installed inside a vacuum chamber. Bulky measurement systems require larger vacuum chambers, significantly increasing the cost and time required for testing. The thrust it generates depends on the discharge frequency and the thrust generated by a single discharge. In the conventional thrust measurement system of pulsed thruster, regardless of whether it adopts a forward pendulum, an inverted pendulum or a side pendulum design, is a static measurement method.

In the conventional static thrust measurement system, before the thruster provides a thrust, the thruster itself is stationary and located at the equilibrium point (or equilibrium height) of the pendulum. After the thruster provides a thrust to make itself swing, the thrust of the pulsed thruster during a single discharge is calculated by recording a swing angle caused by the thruster. The characteristic of the pulse thruster is its low power consumption, but it is precisely because of its low power consumption that its thrust is very small (similar to the intensity of the airflow when breathing). The problem caused by this is that the amplitude of a pendulum is extremely small, so small that it is almost impossible to measure. However, the conventional static thrust measurement system can only measure the thrust during a single discharge, and cannot measure small thrusts, and the precision is insufficient.

Therefore, in order to measure very small swing amplitudes, the conventional static thrust measurement system must use a higher-precision measurement system, which will lead to two problems. Firstly: the precision of the measurement instrument has its physical limit, cannot be extended indefinitely, and secondly: the higher the precision of the measuring instrument, the more complex and rigorous the calibration process must be, otherwise the thrust measurement results will be limited.

In addition, the conventional static thrust measurement system must use large and complex displacement measuring instruments, counterweight systems, liquid metal wires and rotational inertia equilibrium systems. Therefore, its size is too large and it must rely on a large vacuum chamber to carry out the measurement experiments, this will lead to two problems. Firstly: the cost of the vacuum chamber, every time the diameter of the vacuum chamber doubles, its price will increase at least six times (because it is also accompanied by more powerful suction pumps and other equipment costs), and secondly: large vacuum chambers usually require a very long pumping time to reach the required vacuum environment, which will significantly increase the development time and cost of the thruster.

SUMMARY OF THE DISCLOSURE

In view of the above, an object of the disclosure is to provide a dynamic pendulum thrust measurement system and a method thereof to solve the above-mentioned problems in the prior art.

The dynamic pendulum thrust measurement system and the method thereof disclosed by the disclosure are capable of solving defects of the conventional static measurement method. The disclosure can not only measure small thrusts more accurately, but also simplify a design and reduce a size of the measurement system, eliminating cumbersome calibration procedures and thrust measurement can be performed in a small vacuum chamber, thereby reducing the cost and time required to develop pulsed thrusters and satellites.

In order to achieve the aforementioned object, the disclosure discloses a dynamic pendulum thrust measurement system for measuring a thrust provided by a thruster using a dynamic pendulum thrust measurement method. The dynamic pendulum thrust measurement system comprises: a swing arm, the swing arm has a suspension end and a swing end, wherein the swing arm is disposed at a suspension height through the suspension end, the thruster is disposed on the swing end of the swing arm, thereby forming a pendulum structure; a driving device, the driving device raises a positioning point on the pendulum structure to a release height, and then causes the swing end of the pendulum structure to fall under an action of gravity, so that the pendulum structure performs a reciprocating swing process of a preset number of times of swing in a non-thrust set swing step and a thrust set swing step of the dynamic pendulum thrust measurement method respectively, wherein in the non-thrust set swing step, the thruster is in a closed state when the pendulum structure performs the reciprocating swing process, so that the pendulum structure performs a thrustless-assisted pendulum motion during the reciprocating swing process, wherein in the thrust set swing step, when the pendulum structure performs the reciprocating swing process and is provided with an energy, the thruster is started according to a preset number of times of start and a preset start state to correspondingly provide the thrust respectively, so that the pendulum structure performs a thrust-assisted pendulum motion during the reciprocating swing process; and a data capturing device used for respectively obtaining a thrustless-assisted swing datum of the pendulum structure when performing the thrustless-assisted pendulum motion in the non-thrust set swing step, and a thrust-assisted swing datum of the pendulum structure when performing the thrust-assisted pendulum motion in the thrust set swing step, thereby in an operation step of the dynamic pendulum thrust measurement method, the thrust provided by the thruster is calculated based on a difference between the thrustless-assisted swing datum and the thrust-assisted swing datum.

Preferably, in the thrust set swing step, the thruster is started to provide the thrust when the positioning point of the pendulum structure is located at at least one starting height during the reciprocating swing process, wherein the starting height is the release height, or the starting height is any position of the positioning point of the pendulum structure during the reciprocating swing process, wherein the starting height is higher than, equal to or lower than the release height.

Preferably, at least one starting height at which the thruster provides the thrust is conducive to make the thrust-assisted swing datum of the thrust-assisted pendulum motion of the pendulum structure greater than the thrustless-assisted swing datum of the thrustless-assisted pendulum motion.

Preferably, a force application direction of the thrust is conducive to make the thrust-assisted swing datum of the thrust-assisted pendulum motion of the pendulum structure greater than the thrustless-assisted swing datum of the thrustless-assisted pendulum motion.

Preferably, the preset number of times of swing is once or a plurality of times, the preset number of times of start is once or a plurality of times, and/or the preset start state provides the thrust in a pulsed, a continuous or an intermittent manner.

Preferably, the driving device comprises an arc-shaped rack, a semi-gear and a rotating element, the arc-shaped rack is disposed on the swing end of the swing arm, the semi-gear comprises a gear surface and a gearless surface, wherein the gear surface of the semi-gear meshes with the arc-shaped rack, so that the semi-gear is rotated through the rotating element to raise the positioning point of the pendulum structure to the release height, wherein the gearless surface of the semi-gear is configured to not engage with the arc-shaped rack, thereby automatically releasing the swing end of the pendulum structure to cause the pendulum structure to fall under the action of gravity to perform the reciprocating swing process of the preset number of times of swing.

Preferably, the thrustless-assisted swing datum is selected from one or more than one of a group consisting of a swing height, a swing angle, a swing amplitude and a swing frequency of the pendulum structure in the thrustless-assisted pendulum motion, and the thrust-assisted swing datum is selected from one or more than one of a group consisting of a swing height, a swing angle, a swing amplitude and a swing frequency of the pendulum structure in the thrust-assisted pendulum motion.

Preferably, the thruster is a pulsed plasma thruster, a micro gas thruster or a micro thrust generating device.

Preferably, the dynamic pendulum thrust measurement system further comprises a vacuum environment used for enabling the thruster to provide the thrust in the vacuum environment, or enabling the pendulum structure to perform the reciprocating swing process in the vacuum environment.

Preferably, the thruster is started at any position in a forward path of the pendulum structure performing the reciprocating swing process, and/or the thruster is closed at any position in the forward path of the pendulum structure performing the reciprocating swing process.

Preferably, the thruster provides the thrust in a single time in a forward path of the single reciprocating swing process in a pulsed, a continuous or an interval manner.

Preferably, the thruster provides the thrust multiple times in a forward path of the single reciprocating swing process in a pulsed or an intermittent manner.

Preferably, the thruster only performs work on the pendulum structure when the pendulum structure is provided with the energy, wherein the energy is a potential energy and/or a kinetic energy.

Preferably, the pendulum structure is a single pendulum structure.

Preferably, in the thrust set swing step, the thruster is started to provide the thrust to the pendulum structure such that the energy provided to the pendulum structure is accumulated during the reciprocating swing process.

In order to achieve the aforementioned object, the disclosure discloses a dynamic pendulum thrust measurement method for measuring a thrust provided by a thruster using a dynamic pendulum thrust measurement system, the thruster is disposed on a swing arm to form a pendulum structure, comprising following steps of: performing a non-thrust set swing step for raising a positioning point on the pendulum structure to a release height, and then causing a swing end of the pendulum structure to fall under an action of gravity for performing a reciprocating swing process of a preset number of times of swing, wherein the thruster is in a closed state when the pendulum structure performs the reciprocating swing process, so that the pendulum structure performs a thrustless-assisted pendulum motion during the reciprocating swing process; performing a thrust set swing step for raising the positioning point on the pendulum structure to a release height, and then causing the swing end of the pendulum structure to fall under the action of gravity for performing the reciprocating swing process of the preset number of times of swing, wherein when the pendulum structure performs the reciprocating swing process and is provided with an energy, the thruster is started according to a preset number of times of start and a preset start state and correspondingly provides the thrust respectively, so that the pendulum structure performs a thrust-assisted pendulum motion during the reciprocating swing process; and performing an operation step used for calculating the thrust provided by the thruster based on a difference between a thrustless-assisted swing datum of the thrustless-assisted pendulum motion and a thrust-assisted swing datum of the thrust-assisted pendulum motion.

Based on the above, the dynamic pendulum thrust measurement system and the method thereof of the disclosure can have one of following advantages or the following advantages:

(1) The disclosure enables the thruster to provide the thrust when the pendulum structure is provided with an energy (such as potential energy and/or kinetic energy), rather than enabling the thruster to provide the thrust when the pendulum structure is not provided with an energy (such as being in a stationary state or having no potential energy); therefore, compared with the conventional static measurement techniques, the dynamic pendulum thrust measurement system and the method thereof of the disclosure are capable of measuring smaller thrusts.

(2) The disclosure enables the thruster to provide the thrust multiple times and perform single reciprocating swing process or multiple reciprocating swing processes; therefore, capable of avoiding a defect of poor precision caused by the conventional static measurement techniques being capable of only performing single measurement.

(3) The disclosure is capable of simplifying a design of the dynamic pendulum thrust measurement system and achieving an effect of reducing a size. Compared with the conventional static measurement techniques, the disclosure is capable of effectively reducing an overall cost and speeding up a measurement time and improving a precision.

(4) The disclosure is capable of reducing a size of the dynamic pendulum thrust measurement system. Compared with the conventional static measurement techniques, the disclosure is capable of optionally using a smaller vacuum chamber to provide a vacuum environment for performing thrust measurement.

(5) The disclosure uses the driving device with a semi-gear to cause the swing end of the pendulum structure to raise to a release height and then automatically fall to perform the reciprocating swing process.

(6) The disclosure is not limited to starting the thruster at a specific position in the forward path of the reciprocating swing process performed by the pendulum structure, and is not limited to shutting down the thruster at a specific position in the forward path of the reciprocating swing process. As long as the thruster is capable of providing the thrust when the pendulum structure is provided with an energy (potential energy and/or kinetic energy), and for example, is conducive to generating a difference in swing data, it is applicable to the disclosure.

In order to enable the examiner to have a further understanding and recognition of the technical features of the disclosure, preferred embodiments in conjunction with detailed explanation are provided as follows.

DETAILED DESCRIPTION OF THE DISCLOSURE

Figure 1:
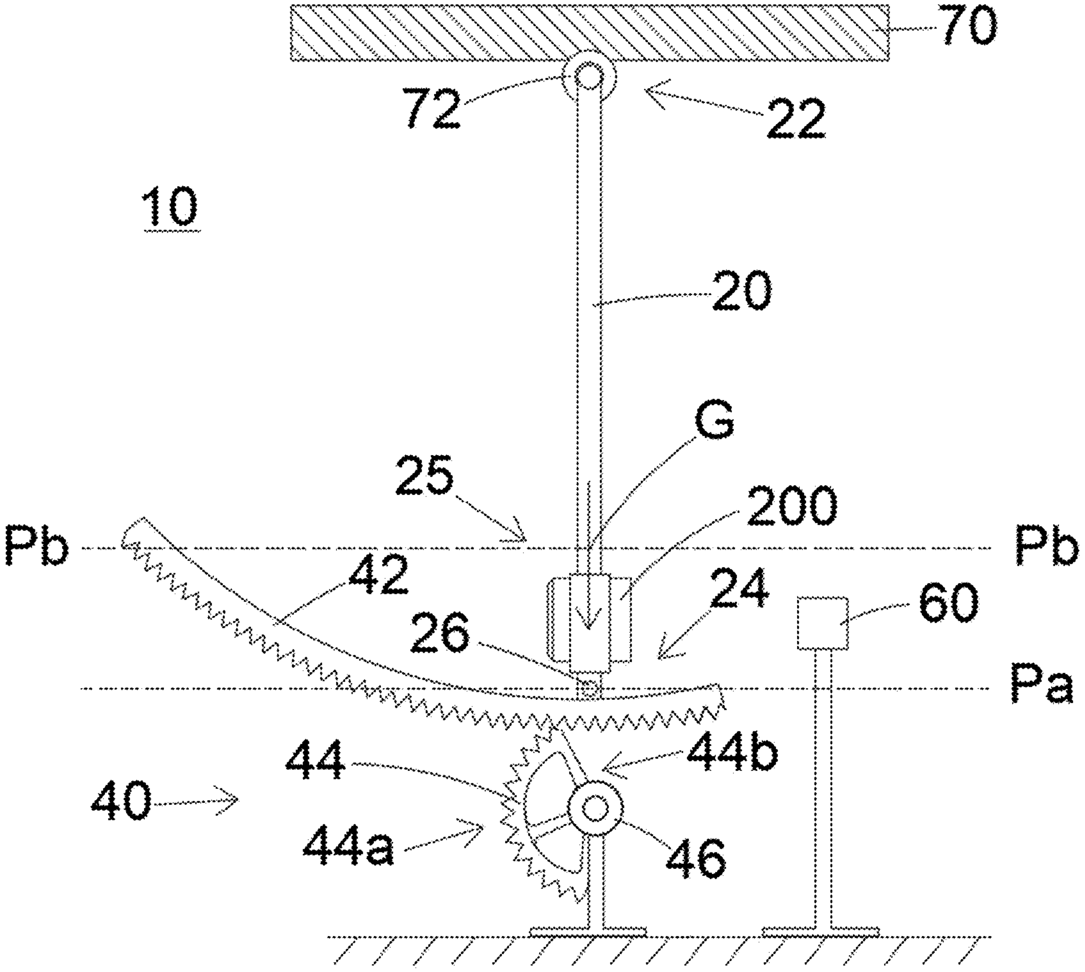
FIG. 1 is a schematic structural diagram of a dynamic pendulum thrust measurement system of the disclosure, showing that during a non-thrust set swing step, a pendulum structure is located at an equilibrium position.
Figure 2:
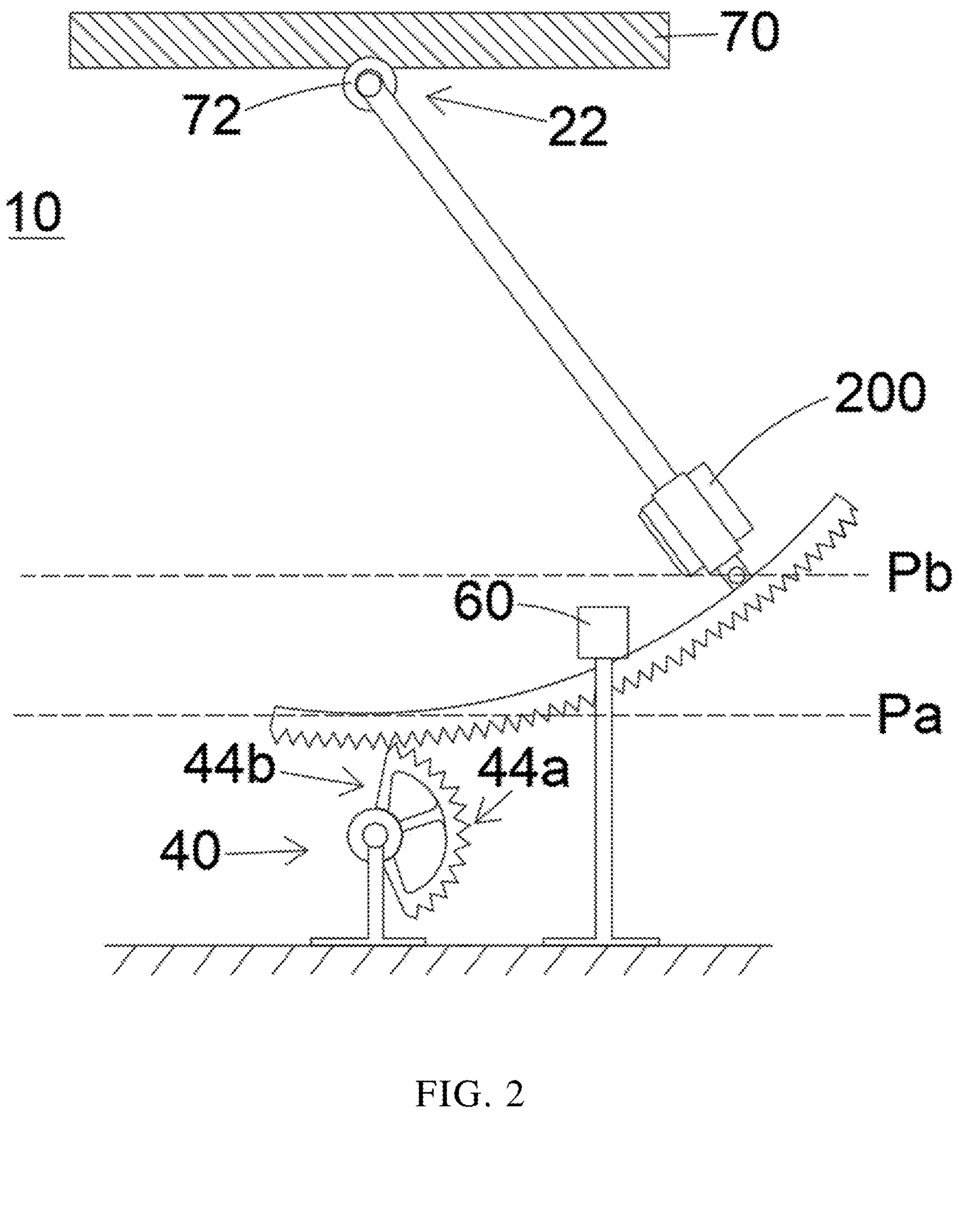
FIG. 2 is a schematic structural diagram of the dynamic pendulum thrust measurement system of the disclosure, showing that during the non-thrust set swing step, the pendulum structure is located at a release height.
Figure 3:
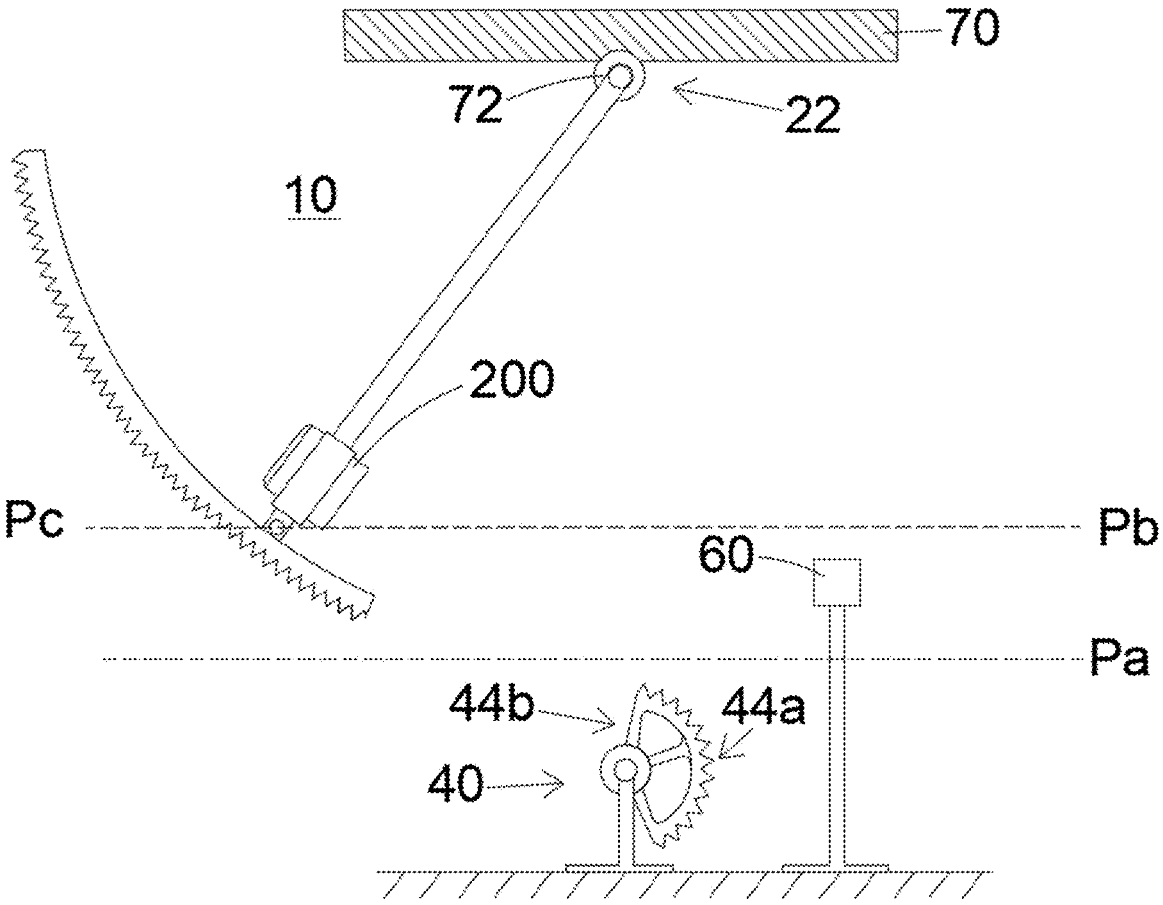
FIG. 3 is a schematic structural diagram of the dynamic pendulum thrust measurement system of the disclosure, showing that during the non-thrust set swing step, the pendulum structure is located at a return height.
Figure 4:
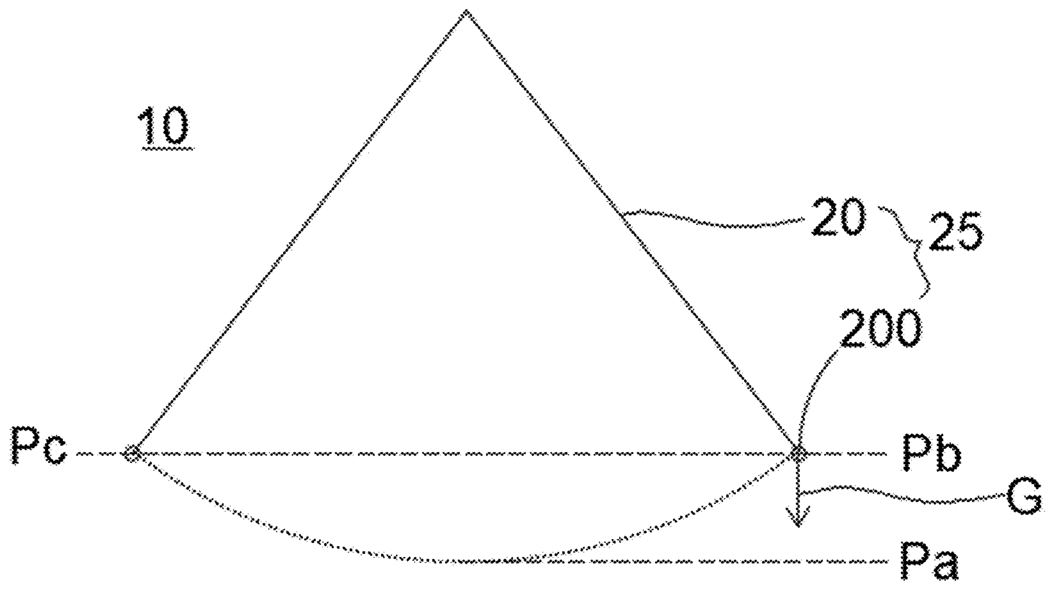
FIG. 4 is a simplified schematic diagram of the dynamic pendulum thrust measurement system of the disclosure used to illustrate an operation of the pendulum structure.
Figure 5:
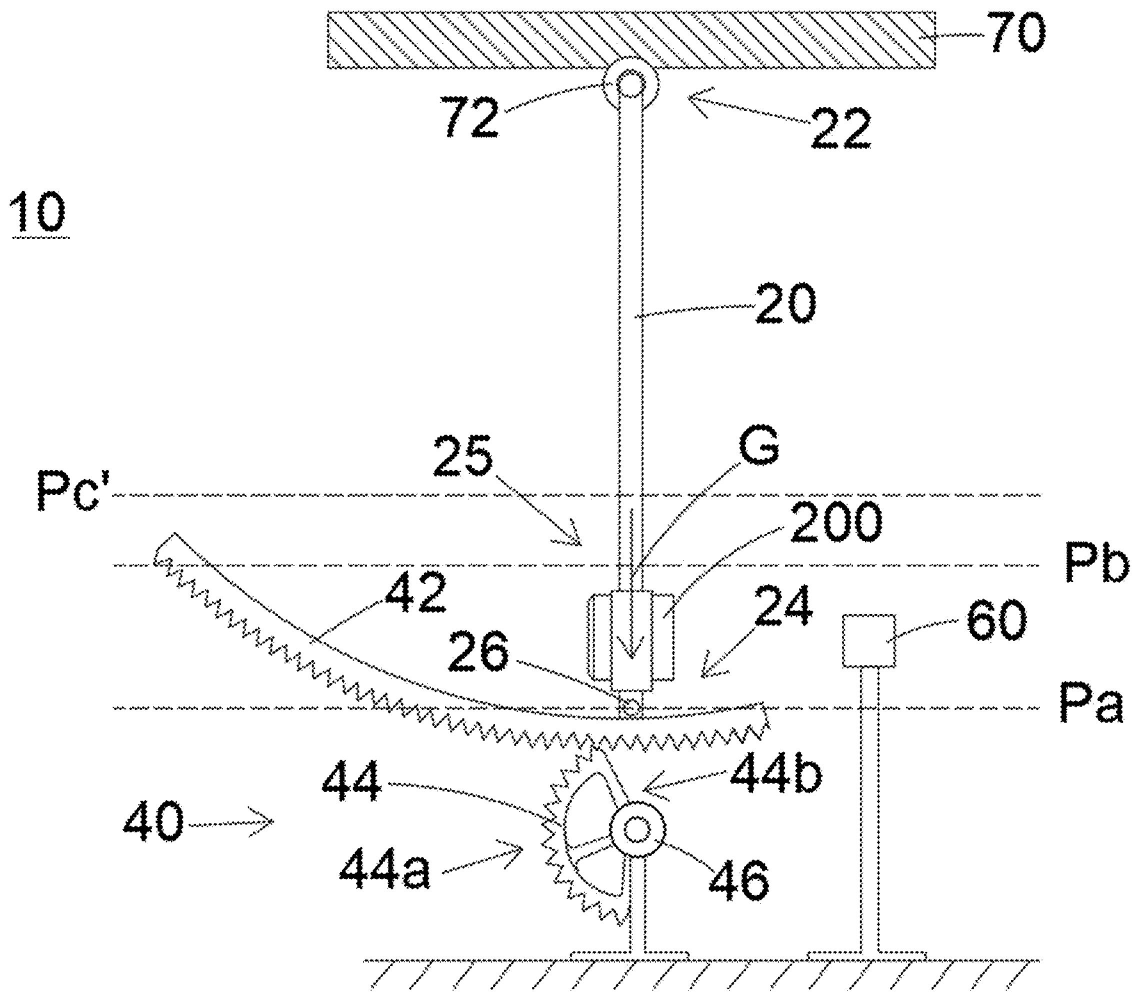
FIG. 5 is a schematic structural diagram of the dynamic pendulum thrust measurement system of the disclosure, showing that during a thrust set swing step, the pendulum structure is located at the equilibrium position.
Figure 6:
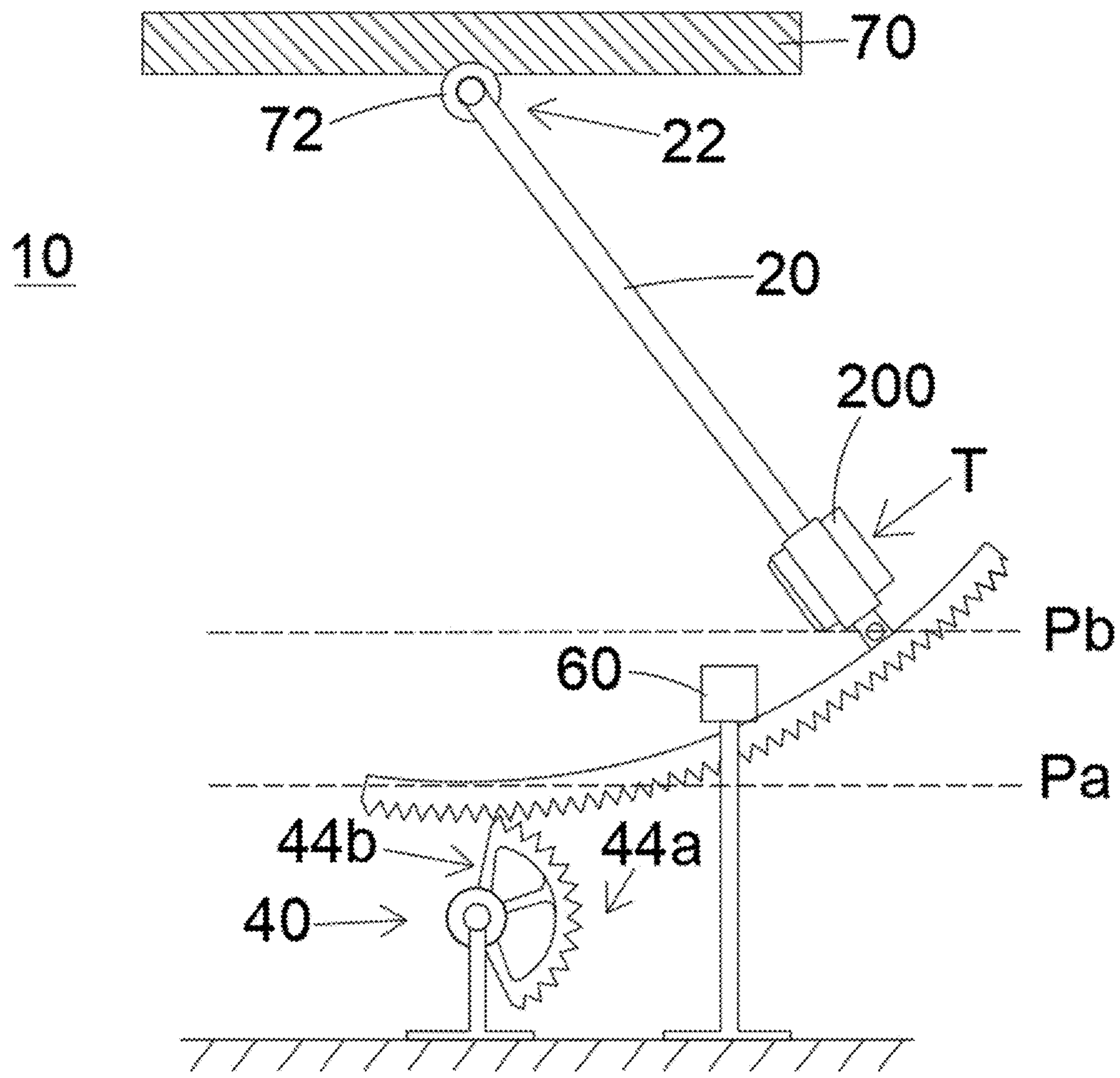
FIG. 6 is a schematic structural diagram of the dynamic pendulum thrust measurement system of the disclosure, showing that during the thrust set swing step, the pendulum structure is located at the release height.
Figure 7:
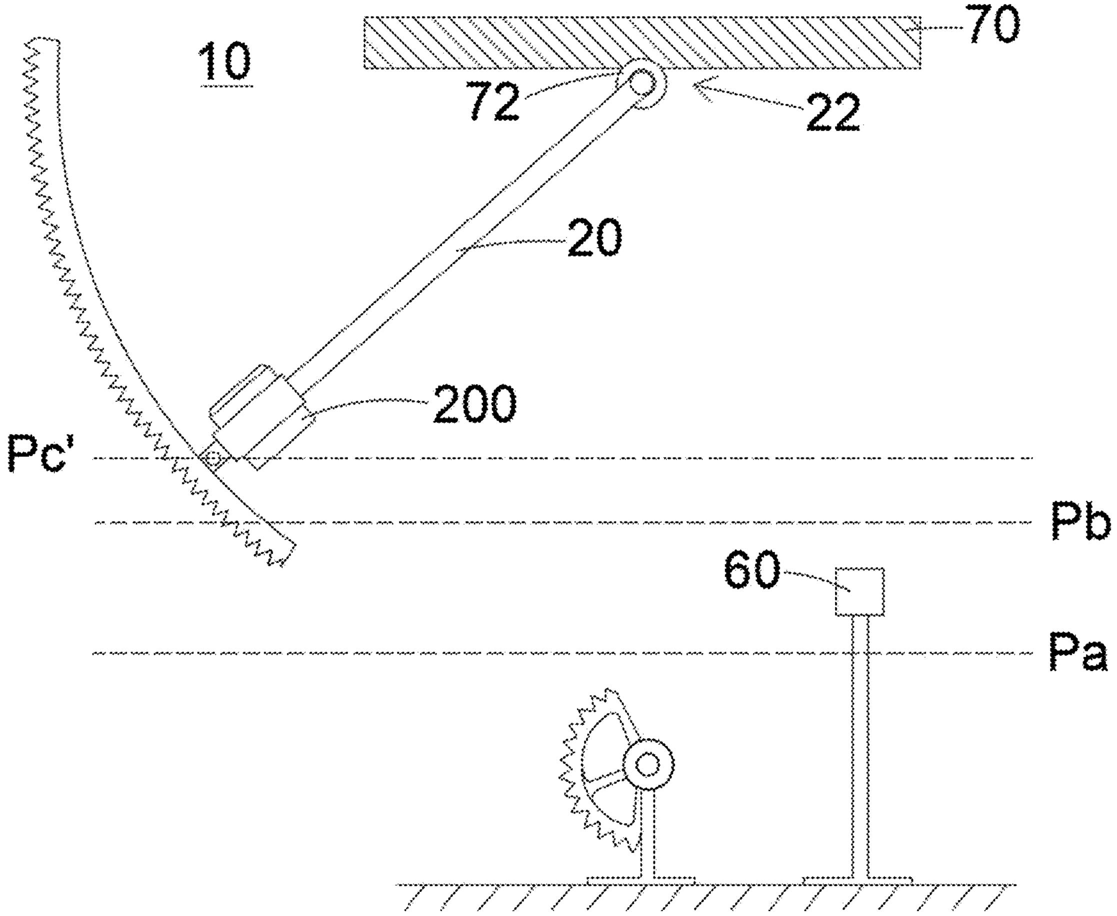
FIG. 7 is a schematic structural diagram of the dynamic pendulum thrust measurement system of the disclosure, showing that during the thrust set swing step, the pendulum structure is located at the return height.

In order to understand the technical features, content and advantages of the disclosure and its achievable efficacies, the disclosure is described below in detail in conjunction with the figures, and in the form of embodiments, the figures used herein are only for a purpose of schematically supplementing the specification, and may not be true proportions and precise configurations after implementation of the disclosure; and therefore, relationship between the proportions and configurations of the attached figures should not be interpreted to limit the scope of the claims of the disclosure in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present disclosure will be defined below or in other parts of the descriptions as an extra guidance for those skilled in the art to understand the descriptions of the present disclosure.

The terms such as “first”, “second”, “third” and “fourth” used in the descriptions are not indicating an order or sequence, and are not intending to limit the scope of the present disclosure. They are used only for differentiation of components or operations described by the same terms.

Moreover, the terms “comprising”, “including”, “having”, and “with” used in the descriptions are all open terms and have the meaning of “comprising but not limited to”.

A dynamic pendulum thrust measurement system and a dynamic pendulum thrust measurement method of the disclosure enable a thruster to provide a thrust when a pendulum structure is provided with an energy (potential energy and/or kinetic energy), rather than providing the thrust when the pendulum structure is not provided with an energy (such as being in a stationary state or having no potential energy) in the conventional techniques, capable of solving defects of the conventional static measurement method, and capable of measuring small thrusts more accurately. The thruster of the disclosure is started to provide the thrust to the pendulum structure such that the energy provided to the pendulum structure is accumulated during the reciprocating swing process. The dynamic pendulum thrust measurement system and the dynamic pendulum thrust measurement method of the disclosure respectively enable the same pendulum structure to perform a reciprocating swing process with two sets of measurement steps (a non-thrust set and a thrust set), and then a difference in swing data between the two sets of the measurement steps of the reciprocating swing process is compared to calculate a numerical value of the thrust.

In a non-thrust set swing step, the disclosure raises the pendulum structure to a fixed height (such as a release height described later), and then releases a swing end of the pendulum structure, enabling the pendulum structure to swing freely only under an action of gravity. In a thrust set swing step, the disclosure also raises the pendulum structure to the same fixed height, and then releases the swing end of the pendulum structure, but instead enabling the pendulum structure to swing under an action of gravity and the thrust provided by the thruster. In other words, a difference in swing data of the two sets (the no-thrust set and the thrust set) in the reciprocating swing process will only be caused by the thrust. Therefore, in an operation step, the disclosure is capable of calculating the thrust provided by the thruster based on a difference in the swing data.

The dynamic pendulum thrust measurement system of the disclosure is capable of effectively reducing a size, can not only eliminate most of the equipment (such as large and complex displacement measurement instruments, counterweight systems, liquid metal wires and rotational inertia equilibrium systems) of the conventional static measurement system, can also eliminate calibration procedures required for these instruments and equipment, and capable of also greatly increasing a thrust measurement precision. The disclosure can also optionally use a smaller vacuum chamber to provide a vacuum environment for performing thrust measurement, thereby reducing cost and time required to develop thrusters (such as pulsed thrusters), and ultimately reducing development costs of satellites.

Please refer to FIGS. 1 to 4, FIGS. 5 to 11, FIG. 12, FIG. 13 and FIGS. 14 to FIG. 15. A dynamic pendulum thrust measurement system 10 of the disclosure, for example, uses the dynamic pendulum thrust measurement method to measure a thrust T provided by a thruster 200. The dynamic pendulum thrust measurement system 10 of the disclosure comprises a swing arm 20, a driving device 40 and a data capturing device 60. For example, the thruster 200 is provided on the swing arm 20, and the thruster 200 is, for example, a pulsed plasma thruster, a micro gas thruster or a micro thrust generating device, but is not limited thereto. The thruster 200 of the disclosure can also be any device capable of providing the thrust T. The pendulum structure is for example a single pendulum structure, but not limited thereto.

The swing arm 20 has a suspension end 22 and a swing end 24. The suspension end 22 and the swing end 24 are respectively located at two ends of a swing body of the swing arm 20, for example. The swing arm 20 is disposed at a suspension height through the suspension end 22, and the thruster 200 is disposed on the swing end 24 of the swing arm 20, thereby forming a pendulum structure 25. The suspension height is substantially higher than an overall length of the pendulum structure 25. The dynamic pendulum thrust measurement system 10 of the disclosure can optionally comprise a support frame 70, the suspension end 22 of the swing arm 20 is swingably mounted on the support frame 70. The support frame 70 has a suspension portion 72, such as a bearing or a vacuum bearing, located at the suspension height, and the suspension end 22 is rotatably provided on the suspension portion 72 to achieve a swing function.

Figure 13:
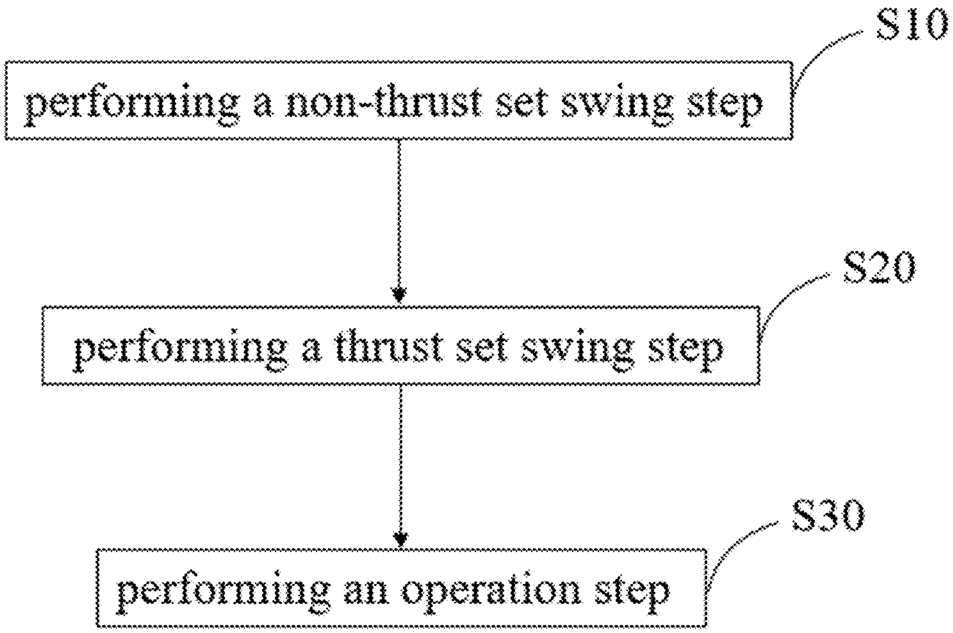
FIG. 13 is a flow chart of a dynamic pendulum thrust measurement method of the disclosure.
Figure 14:
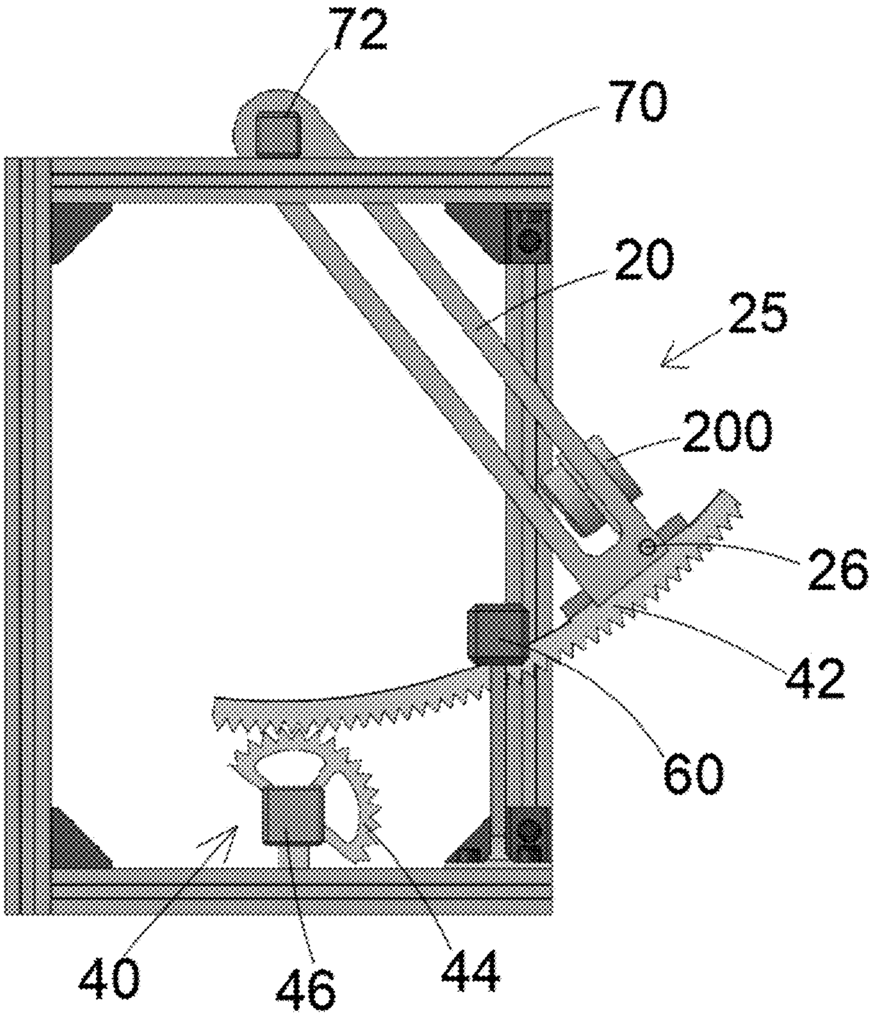
FIG. 14 is a cross-sectional view of an implementation mode of the dynamic pendulum thrust measurement system of the disclosure.
Figure 15:
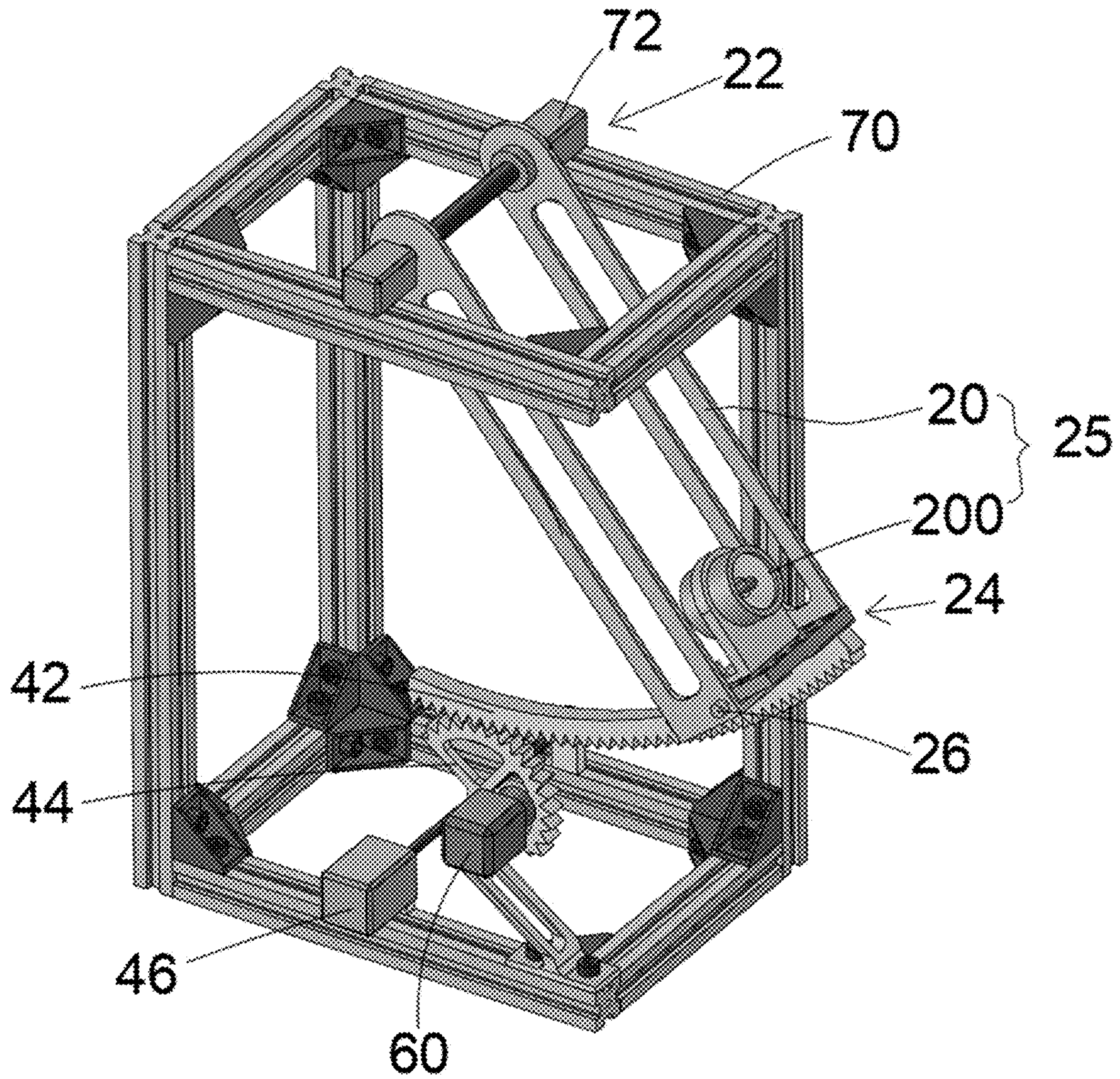
FIG. 15 is a perspective view of the dynamic pendulum thrust measurement system shown in FIG. 14.

The driving device 40 is used to raise a positioning point 26 on the pendulum structure 25 to a preset release height Pb, and then enable the swing end 24 of the pendulum structure 25 to fall under an action of gravity G, so that the pendulum structure 25 performs the reciprocating swing process of a preset number of times of swing in a non-thrust set swing step S10 and a thrust set swing step S20 of the dynamic pendulum thrust measurement method (as shown in FIG. 13) respectively. In other words, the pendulum structure 25 performs the reciprocating swing process of the preset number of times of swing in the non-thrust set swing step S10, and the pendulum structure 25 also performs the reciprocating swing process of the preset number of times of swing in the thrust set swing step S20. The driving device 40 can be driven automatically or manually, directly or indirectly, to make the swing end 24 of the pendulum structure 25 fall under the action of gravity G. The preset number of times of swing can be one time or multiple times. In order to improve a precision of the thrust T calculated in a subsequent operation step S30 (as shown in FIG. 13), the disclosure preferably sets the preset number of times of swing to a plurality of times. By averaging multiple measurements, an effect of errors of single measurement can be reduced. The positioning point 26 can be any defined point on the pendulum structure 25, or any positioning label, mark or other substantial element located on the pendulum structure 25. When the pendulum structure 25 is at an equilibrium position (lowest point), the positioning point 26 is located at an equilibrium height Pa.

In a feasible implementation example of the disclosure, the driving device 40 comprises, for example, an arc-shaped rack 42, a semi-gear 44 and a rotating element 46. The rotating element 46 is, for example, an electric rotating mechanism such as a motor or a vacuum stepper motor, and the semi-gear 44 is, for example, provided on a rotating shaft of a motor. The arc-shaped rack 42 is disposed on the swing end 24 of the swing arm 20. The semi-gear 44 comprises a gear surface 44*a* and a gearless surface 44*b*. The gear surface 44*a* of the semi-gear 44 is used to mesh with a gear on the arc-shaped rack 42, so that the semi-gear 44 is rotated through the rotating element 46 to raise the positioning point 26 of the pendulum structure 25 to the release height Pb, the gearless surface 44*b* of the semi-gear 44 is clutched to the arc-shaped rack 42, thereby automatically releasing the swing end 24 of the pendulum structure 25 to cause the pendulum structure 25 to fall under the action of gravity G to perform the reciprocating swing process of the preset number of times of swing.

As shown in FIGS. 1 to 4 and FIGS. 13 to 15, in the non-thrust set swing step S10 of the dynamic pendulum thrust measurement method of the disclosure, the thruster 200 is in a closed state (i.e., no thrust is provided) when the pendulum structure 25 performs the reciprocating swing process, thereby enabling the pendulum structure 25 to perform a thrustless-assisted pendulum motion during the reciprocating swing process (e.g., in a forward path). The reciprocating swing process performed by the pendulum structure 25 in the non-thrust set swing step S10 is only acted upon by the gravity G of the earth, so the disclosure defines it as the "thrustless-assisted pendulum motion." The gravity G acts continuously on the pendulum structure 25. When the pendulum structure 25 is released at the release height Pb on the right side of FIG. 2 and falls and swings due to the gravity G, the pendulum structure 25 can reach a highest position (i.e., a return height Pc) on the left side of FIG. 3. If there is no resistance, then the highest position (i.e., the return height Pc) on the left side of the thrustless-assisted pendulum motion of the pendulum structure 25 will be at a same height as the release height Pb. If there is resistance, then the highest position (i.e., the return height Pc) on the left side of the thrustless-assisted pendulum motion of the pendulum structure 25 will be lower than the release height Pb.

As shown in FIGS. 5 to 15, in the thrust set swing step S20 of the dynamic pendulum thrust measurement method of the disclosure, the driving device 40 raises the positioning point 26 on the pendulum structure 25 to the release height Pb, and then enables the swing end 24 of the pendulum structure 25 to fall under the action of gravity G. One feature of the disclosure is that the thruster 200 is provided with an energy (for example, potential energy, kinetic energy or other various types of energy) when the pendulum structure 25 performs the reciprocating swing process of the preset number of times of swing (for example, any position in a forward path of the reciprocating swing process), and correspondingly provides the thrust T according to a preset number of times of start and a preset start state respectively, so that the pendulum structure 25 is capable of performing a thrust-assisted pendulum motion during the reciprocating swing process (such as a forward path). The preset number of times of start (or preset number of times of discharge) can be one time or multiple times. The preset start state can provide the thrust T in pulse type, provide the thrust T continuously or provide the thrust T intermittently. One feature of the disclosure is that the thruster 200 provides the thrust T when the pendulum structure 25 is provided with an energy (such as potential energy or kinetic energy). Therefore, the disclosure can be applied to accurately measuring the small thrust T, the disclosure is capable of measuring the thrust T smaller than that of the conventional techniques, and a measurement precision of the disclosure is higher than that of the conventional techniques. When the thrust T provided by the thruster 200 is quite small, the preset number of times of start is preferably a plurality of times, thereby increasing a precision of measuring the thrust T. For example, providing the thrust T multiple times is conducive to increasing a scalability of the thrust-assisted pendulum motion, and can further reduce errors caused by the thrust T provided by the thruster 200 not being exactly the same each time it is started.

A starting height Pr (or corresponding starting time point) at which the thruster 200 provides the thrust T is conducive to make a thrust-assisted swing datum of the thrust-assisted pendulum motion of the pendulum structure 25 different from (e.g., greater than) a thrustless-assisted swing datum of the thrustless-assisted pendulum motion. A force application direction of the thrust T provided by the thruster 200 is conducive to make the thrust-assisted swing datum of the thrust-assisted pendulum motion of the pendulum structure 25 different from (e.g., greater than) the thrustless-assisted swing datum of the thrustless-assisted pendulum motion.

The disclosure is capable of performing the preset number of time of start or the preset number of times of start during part or all of the reciprocating swing process of the preset number of times of swing (for example, on a forward path) and correspondingly providing one time of the thrust T or multiple times of the thrust T, thereby increasing a precision of the calculated thrust T. For example, assuming that the preset number of times of swing is 5 times, it means that the reciprocating swing process is 5 times; assuming that the preset number of times of start is 3 times, it means that the thruster 200 provides a total of 3 times of the thrust T in 5 forward paths of the 5 reciprocating swing processes, and a sum of 3 times of the thrust T is a total thrust. Therefore, if a total thrust is divided by a number of starts of the thruster 200 (depending on how many times it discharges), a precise numerical value of the single thrust T can be calculated.

The reciprocating swing process performed by the pendulum structure 25 in the thrust set swing step S20 is acted upon by the gravity G of the earth and the thrust T of the thruster 200. Therefore, the disclosure defines it as the "thrust-assisted pendulum motion." The gravity G continuously acts on the pendulum structure 25. The thrust T of the thruster 200 is, for example, a single action (the preset number of times of start is one time) or multiple actions (the preset number of times of start is multiple times). The preset start state of the thruster 200 is, for example, being started to generate the thrust T and then closing immediately, or continuing to be started to generate the thrust T until the positioning point 26 reaches a closing height Po and then closing.

Figure 8:
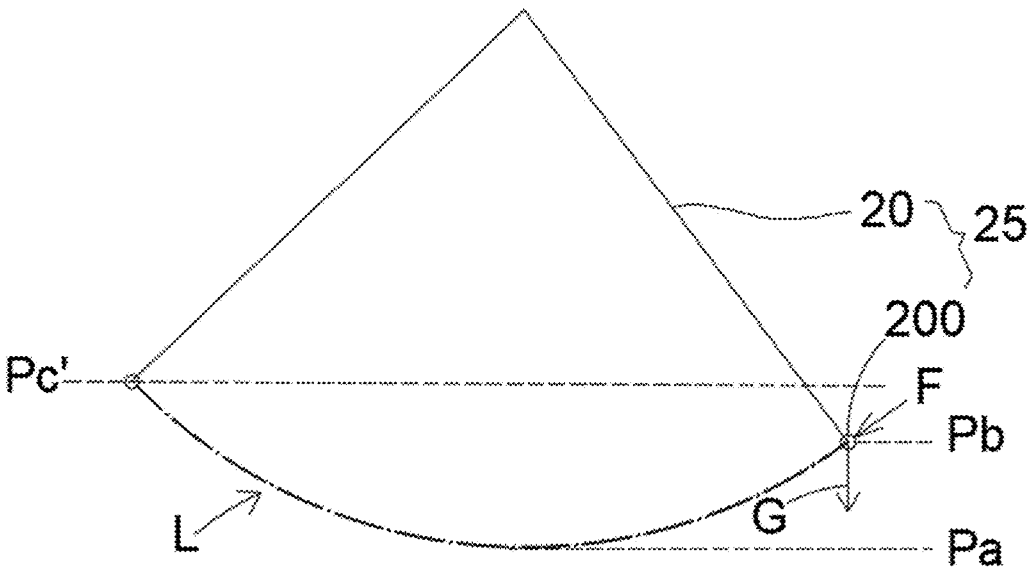
FIG. 8 is a simplified schematic diagram of the dynamic pendulum thrust measurement system of the disclosure, wherein a thruster continuously provides a thrust from the release height to the return height.
Figure 9:
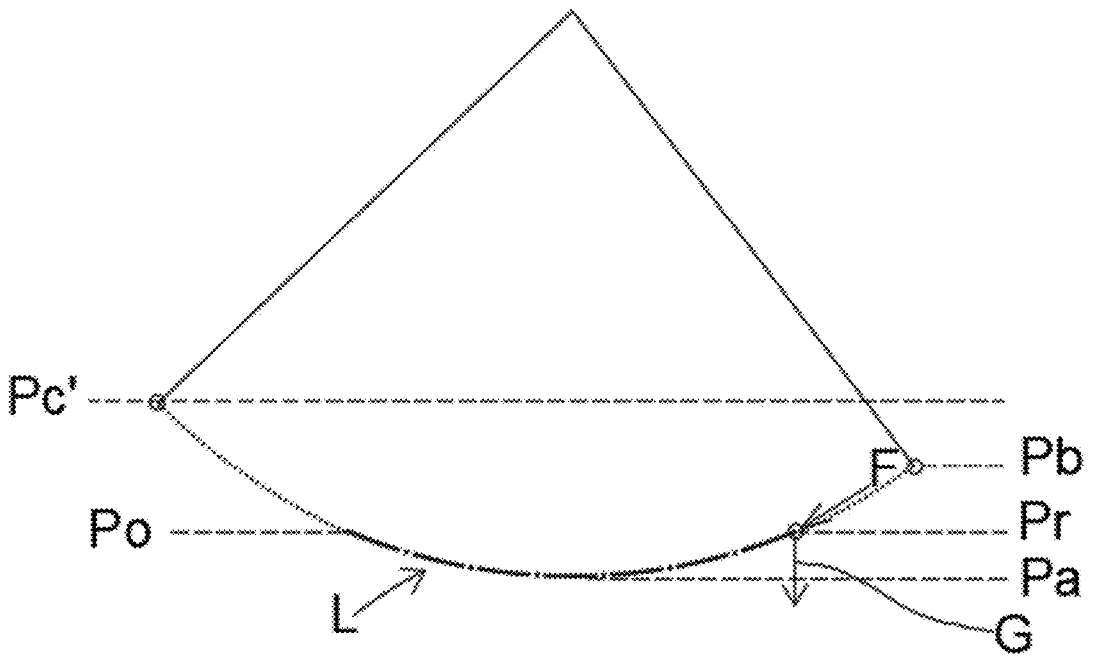
FIG. 9 is a simplified schematic diagram of the dynamic pendulum thrust measurement system of the disclosure, wherein the thruster continuously provides the thrust from a starting height to a closing height.
Figure 10:
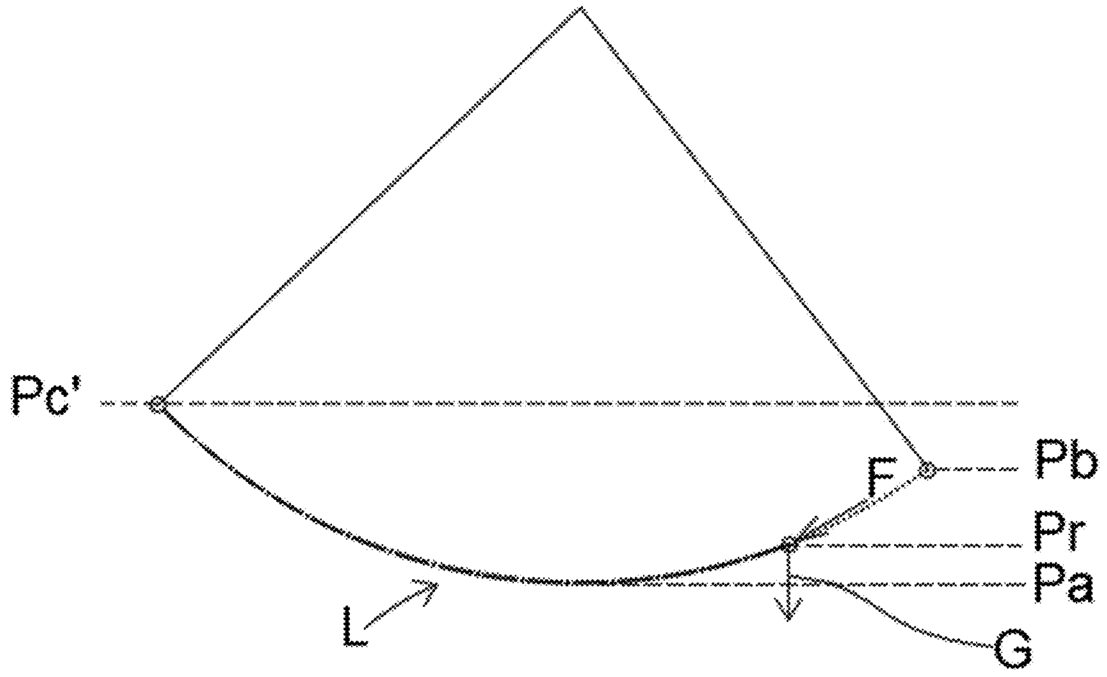
FIG. 10 is a simplified schematic diagram of the dynamic pendulum thrust measurement system of the disclosure, wherein the thruster continuously provides the thrust between the starting height and the return height.
Figure 11:
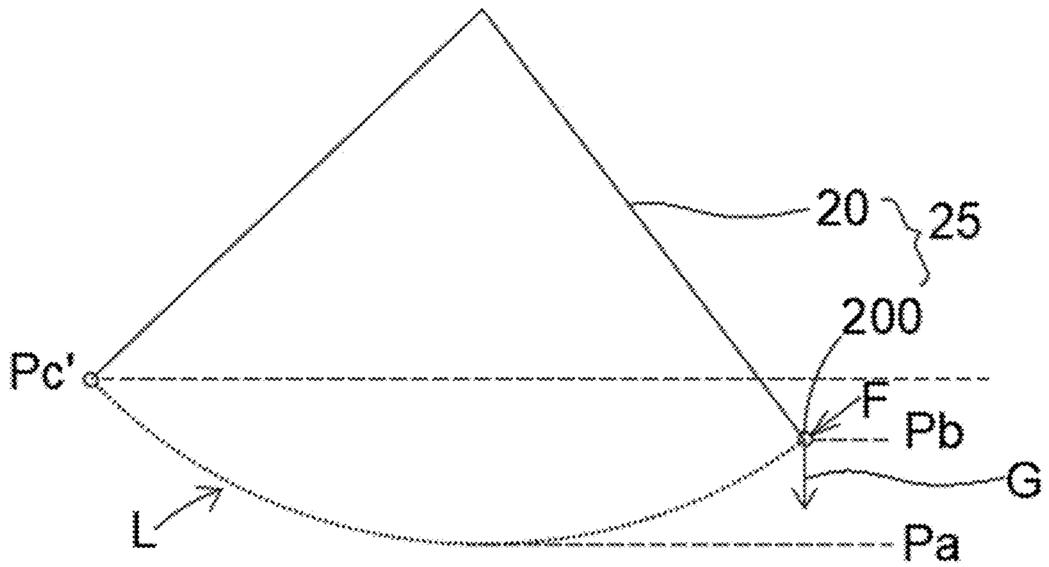
FIG. 11 is a simplified schematic diagram of the dynamic pendulum thrust measurement system of the disclosure, wherein the thruster only provides the thrust at the starting height.

For example, for a design in which the thrust T can assist a pendulum motion, the disclosure can optionally define the starting height Pr on a forward path (rather than a return path) of a reciprocating swing path of the reciprocating swing process of the pendulum structure 25, thereby starting the thruster 200 at the starting height Pr on a forward path (as shown in FIGS. 8 to 11). During the reciprocating swing process of the preset number of times of swing of the pendulum structure 25, the thruster 200 of the disclosure can be started immediately when the positioning point 26 on the pendulum structure 25 reaches the starting height Pr to generate the thrust T and then closes immediately (as shown in FIG. 11), thereby providing the thrust T in a single time (pulse type), or the thruster 200 is continuously started to provide the thrust T until the positioning point 26 reaches a highest position (i.e., a return height Pc') and then closes (as shown in FIG. 8), thereby providing the thrust T in a single time (continuously), wherein the pendulum structure 25 can reach a highest position on the left (i.e., the return height Pc') with an assistance of the thrust T. Although highest positions on the left side that can be reached by the various methods of providing the thrust T mentioned above are different, in order to simplify explanation and avoid complication, the disclosure is represented by the return height Pc'. The starting height Pr is higher than, equal to (as shown in FIGS. 8 and 11) or lower than (as shown in FIGS. 9 and 10) the release height Pb.

In addition, the disclosure can also optionally define the closing height Po on a forward path of the pendulum structure 25 during the reciprocating swing process according to requirements (as shown in FIGS. 8 to 11), thereby during the reciprocating swing process of the preset number of times of swing of the structure 25, the thruster 200 of the disclosure can immediately shut down the thruster 200 when the positioning point 26 on the pendulum structure 25 reaches the closing height Po, thereby providing the thrust T in a single time (in an interval manner). The closing height Po is equal to (as shown in FIGS. 8 and 10) or lower than (as shown in FIG. 9) the return height Pc'. Since the starting height Pr, the return height Pc', the equilibrium height Pa and/or the closing height Po can find corresponding positions on a forward path during the reciprocating swing process of the pendulum structure 25, a path length L of the thrust T (that is, in the path length L, the thruster 200 continues to provide the thrust T) provided by the thruster 200 can be known easily, thereby a swing angle corresponding to the path length L can be known. In addition, based on the same principle, a person having ordinary skill in the art to which the disclosure pertains should be able to understand through the disclosure of the disclosure that if the disclosure is changed to a design that uses the thrust T to block a pendulum motion, then the disclosure can be modified to define the starting height Pr on a return path (rather than a forward path) of the reciprocating swing process of the pendulum structure 25, and it should be clear how to calculate the thrust T provided by the thruster 200, so it will not be described in detail here.

The disclosure can also repeat the reciprocating swing process multiple times according to actual requirements (for example, if the thrust T is too small), thereby providing a total thrust by providing the thrust T multiple times. For example, the return height Pc' can be increased to improve precision. In addition, in other feasible examples of the disclosure, the starting height Pr can also be more than one, thereby, during the reciprocating swing process (for example, in a forward path) of the preset number of times of swing (single time or multiple times) of the pendulum structure 25, the disclosure can start the thruster 200 multiple times to generate the thrust T and then immediately shut down. The thrust T is also provided multiple times to provide a total thrust, thereby improving precision.

Wherein, by dividing a total thrust by a number of times of start of the thruster 200 (depends how many times it is discharged), a precise numerical value of the single thrust T can be calculated. However, the disclosure is not limited to the above examples. The thruster 200 of the disclosure can adopt various modes to provide the thrust T. When the preset number of times of start of the thruster 200 is a plurality of times, the starting heights Pr and/or the closing heights Po of the thrusts T provided by the thruster 200 multiple times are preferably the same as one another, but the disclosure is not limited thereto. The starting heights Pr and/or the closing heights Po can also be different from one another. As long as these thrusts T do not cancel out one another (that is, thrust phases of the thrusts T provided multiple times are all in a same phase, such as a force application direction of the thrust T provided by the thruster 200 is consistent with a movement direction of the pendulum structure 25), it can be applied to the disclosure. Wherein the starting height Pr can be, for example, the release height Pb, or the starting height Pr is any position of the positioning point 26 of the pendulum structure 25 during the reciprocating swing process (e.g., in a forward path).

In addition, in the thrust set swing step S20 of the disclosure, the preset starting state of the thruster 200 can be pulse type, continuous type or intermittent type to provide the thrust T. For example, the thruster 200 is started to provide the thrust T when the positioning point 26 of the pendulum structure 25 reaches at least the one starting height Pr during the reciprocating swing process (for example, in a forward path) and then shuts down immediately, or is started when the positioning point 26 reaches the starting height Pr, and continues to provide the thrust T until the positioning point 26 reaches the closing height Po, and then turns off the thrust T.

The dynamic pendulum thrust measurement system 10 of the disclosure comprises the data capturing device 60 for obtaining pendulum motion characteristics (the thrustless-assisted swing datum) of the pendulum structure 25 when performing the thrustless-assisted pendulum motion in the non-thrust set swing step S10, and for obtaining pendulum motion characteristics (the thrust-assisted swing datum) of the pendulum structure 25 when performing the thrust-assisted pendulum motion in the thrust set swing step S20. The thrustless-assisted swing datum is, for example, selected from one or more than one of a group consisting of a swing height, a swing angle, a swing amplitude and/or a swing frequency of the pendulum structure 25 in the thrustless-assisted pendulum motion. The thrust-assisted swing datum is, for example, selected from one or more than one of a group consisting of a swing height, a swing angle, a swing amplitude and/or a swing frequency of the pendulum structure 25 in the thrust-assisted pendulum motion.

For example, the data capturing device 60 is, for example, a monitoring device such as an image monitor (e.g., camera). The data capturing device 60 is capable of, for example, recording the thrustless-assisted swing datum of the pendulum structure 25 when performing the thrustless-assisted pendulum motion and the thrust-assisted swing datum when performing the thrust-assisted pendulum motion by observing or monitoring the positioning point 26 (e.g., a position of an image of the positioning point 26) on the pendulum structure 25. However, the disclosure is not limited thereto. The data capturing device 60 of the disclosure can also be any various measuring instruments that can be used to obtain pendulum motion characteristics (such as swing data) of the pendulum structure 25 when performing the reciprocating swing process, such as sensors, etc. Sensors are, for example, optical sensors, distance sensors or pressure sensors.

The dynamic pendulum thrust measurement system 10 of the disclosure, for example, can perform the operation step S30 in the dynamic pendulum thrust measurement method used for calculating the thrust T provided by the thruster 200 based on a difference between the thrustless-assisted swing datum of the thrustless-assisted pendulum motion and the thrust-assisted swing datum of the thrust-assisted pendulum motion performed by the pendulum structure 25. In addition, the disclosure can cross-compare a difference in swing data generated by the two sets of measurement steps (the non-thrust set swing step S10 and the thrust set swing step S20) by means of algorithms, mechanical identification or manual calculation and use the commonly known pendulum motion formulas (such as single pendulum motion) to calculate the thrust T provided by the thruster 200.

Since the dynamic pendulum thrust measurement system 10 of the disclosure compares a difference in swing data generated by the same pendulum structure 25 with or without thrust in order to calculate the thrust T; parameters that need to be considered in the conventional calculation of pendulum motion, such as a length of the swing arm 20, a weight of the swing arm 20, a weight of the thruster 200, and air resistance, etc., will not affect calculation of the thrust T by the disclosure. Therefore, a design of the dynamic pendulum thrust measurement system 10 is greatly simplified, thereby reducing a size and eliminating cumbersome calibration procedures. Moreover, an operating environment of the dynamic pendulum thrust measurement system 10 of the disclosure is not limited to a normal pressure environment or a vacuum environment. As long as the thruster 200 is capable of generating the thrust T, it is applicable to the disclosure. Taking a normal pressure environment as an example, the thruster 200 can be, for example, a micro gas thruster, so that the thruster 200 is enabled to provide the thrust T in a normal pressure environment, or the pendulum structure 25 is enabled to perform the reciprocating swing process in a normal pressure environment. Taking a vacuum environment as an example, the thruster 200 is, for example, a pulsed plasma thruster, so that the thruster 200 can provide the thrust T in a vacuum environment, or the pendulum structure 25 is enabled to perform the reciprocating swing process in the vacuum environment. For example, the disclosure uses a vacuum chamber to provide the above-mentioned vacuum environment.

Figure 12:
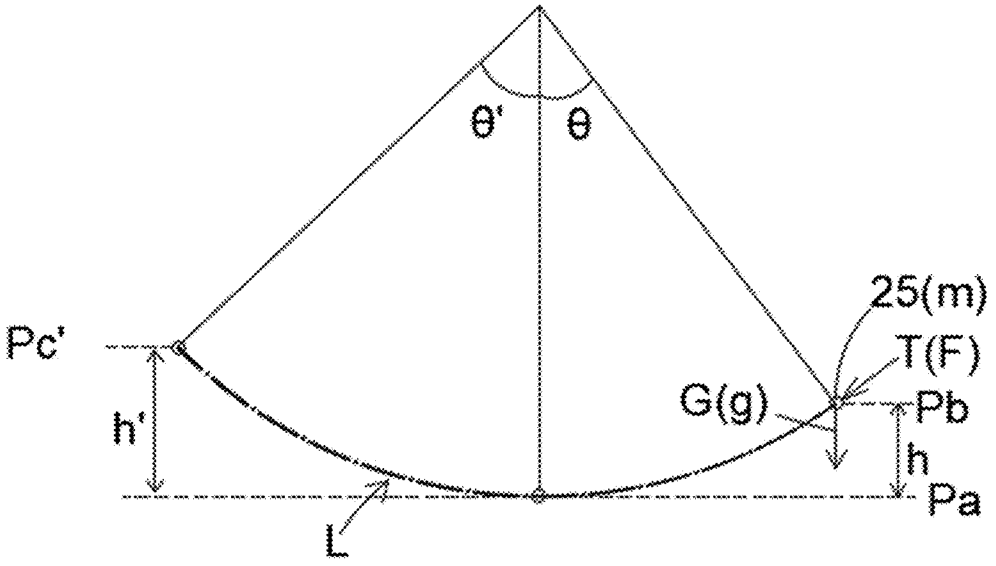
FIG. 12 is a simplified schematic diagram of the dynamic pendulum thrust measurement system of the disclosure, wherein the thruster continuously provides the thrust between the starting height and the return height.

FIG. 12 is a schematic diagram illustrating the reciprocating swing process of the pendulum structure 25 (weight m) after falling from the release height Pb (height h), in which the thruster 200 is started according to the preset number of times of start and the preset start state to provide the thrust T, wherein the preset number of times of start is a plurality of times, and the preset start state is to continuously provide the thrust T. Please refer to FIGS. 1 to 13. FIG. 12 is used to briefly illustrate one of methods of calculating the thrust T by using a difference between the thrustless-assisted swing datum and the thrust-assisted swing datum adopted by the disclosure.

When the pendulum structure 25 (weight m) falls from the release height Pb (height h) to perform the reciprocating process and is continuously supplied with the thrust T (numerical value of F) by the thruster 200 from right to left (from the right side of FIG. 12 to the left side of FIG. 12), then an energy possessed by the pendulum structure 25 (weight m) will increase a numerical value of the thrust T times the path length L (i.e., F×L), and finally the energy (a highest position on the left, that is, the return height Pc') is completely converted into potential energy.

Wherein, $$L = 2\pi r \times \left(\frac{\theta + \theta'}{360}\right),$$

then a relevant formula for height change of the pendulum structure 25 is as follows $$mgh + 2\pi r \times \left(\frac{\theta + \theta'}{360}\right) \times F = mgh',$$

and a relational expression between θ' and a final height h' is:

$$\theta' = \cos^{-1}\left(\frac{r - h'}{r}\right),$$

so the disclosure can derive the numerical value F of the thrust T accordingly.

Assuming that a resistance during a movement of the pendulum structure 25 (weight m) is negligible or controllable, then the pendulum structure 25 with a weight of 1 kg is lowered from a height of 10 cm, a radius r of the pendulum structure 25 is 50 cm, that is, θ is 37 degrees. If the pendulum structure 25 swings from right to left "once" (swinging from the right side of FIG. 12 to the left side of FIG. 12, and the thrust T continues to be turned on during a process), the height h' becomes 11 cm, then a magnitude of the thrust T is:

$$1 \times 9.8 \times 0.1 + 2\pi \times r \times \left(\frac{37 + \cos^{-1}(0.5 - 0.11/0.5)}{360}\right) \times F = 1 \times 9.8 \times 0.11.$$

Therefore, after calculation, a numerical value of the thrust T is: F=0.1482 [N].

It should be noted that although the disclosure attempts to use the above calculation formula to illustrate how the disclosure calculates the numerical value F of the thrust T based on swing data (height and swing angle), the disclosure is not limited to the above formula. The disclosure can also use various other feasible formulas or other swing data to calculate the numerical value F of the thrust T. Since based on the foregoing disclosure of the disclosure, a person having ordinary skill in the art to which the disclosure pertains should understand how to calculate the numerical value F of the thrust T based on a difference between the thrustless-assisted swing datum and the thrust-assisted swing datum and according to the existing pendulum motion formulas (such as single pendulum motion formulas), and the existing pendulum motion formulas are not a technical focus of the disclosure, so they will not be described in detail here.

Based on the above, the dynamic pendulum thrust measurement system and the method thereof of the disclosure can have one of following advantages or the following advantages:

(1) The disclosure enables the thruster to provide the thrust when the pendulum structure is provided with an energy (such as potential energy and/or kinetic energy), rather than enabling the thruster to provide the thrust when the pendulum structure is not provided with an energy (such as being in a stationary state or having no potential energy); therefore, compared with the conventional static measurement techniques, the dynamic pendulum thrust measurement system and the method thereof of the disclosure are capable of measuring smaller thrusts.

(2) The disclosure enables the thruster to provide the thrust multiple times and perform single reciprocating swing process or multiple reciprocating swing processes; therefore, capable of avoiding a defect of poor precision caused by the conventional static measurement techniques being capable of only performing single measurement.

(3) The disclosure is capable of simplifying a design of the dynamic pendulum thrust measurement system and achieving an effect of reducing a size. Compared with the conventional static measurement techniques, the disclosure is capable of effectively reducing an overall cost and speeding up a measurement time and improving a precision.

(4) The disclosure is capable of reducing a size of the dynamic pendulum thrust measurement system. Compared with the conventional static measurement techniques, the disclosure is capable of optionally using a smaller vacuum chamber to provide a vacuum environment for performing thrust measurement.

(5) The disclosure uses the driving device with a semi-gear to cause the swing end of the pendulum structure to raise to a release height and then automatically fall to perform the reciprocating swing process.

(6) The disclosure is not limited to starting the thruster at a specific position in the forward path of the reciprocating swing process performed by the pendulum structure, and is not limited to shutting down the thruster at a specific position in the forward path of the reciprocating swing process. As long as the thruster is capable of providing the thrust when the pendulum structure is provided with an energy (potential energy and/or kinetic energy), and for example, is conducive to generating a difference in swing data, it is applicable to the disclosure.

Note that the specification relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. A dynamic pendulum thrust measurement system for measuring a thrust provided by a thruster using a dynamic pendulum thrust measurement method, the dynamic pendulum thrust measurement system comprising:

a swing arm, the swing arm having a suspension end and a swing end, wherein the swing arm is disposed at a suspension height through the suspension end, the thruster is disposed on the swing end of the swing arm, thereby forming a pendulum structure;

a driving device, the driving device raising a positioning point on the pendulum structure to a release height, and then causing the swing end of the pendulum structure to fall under an action of gravity, so that the pendulum structure performing a reciprocating swing process of a preset number of times of swing in a non-thrust set swing step and a thrust set swing step of the dynamic pendulum thrust measurement method respectively;

wherein in the non-thrust set swing step, the thruster is in a closed state when the pendulum structure performs the reciprocating swing process, so that the pendulum structure performs a thrustless-assisted pendulum motion during the reciprocating swing process;

wherein in the thrust set swing step, when the pendulum structure performs the reciprocating swing process and is provided with an energy, the thruster is started according to a preset number of times of start and a preset start state to correspondingly provide the thrust respectively, so that the pendulum structure performs a thrust-assisted pendulum motion during the reciprocating swing process; and a data capturing device used for respectively obtaining a thrustless-assisted swing datum of the pendulum structure when performing the thrustless-assisted pendulum motion in the non-thrust set swing step, and a thrust-assisted swing datum of the pendulum structure when performing the thrust-assisted pendulum motion in the thrust set swing step, thereby in an operation step of the dynamic pendulum thrust measurement method, the thrust provided by the thruster being calculated based on a difference between the thrustless-assisted swing datum and the thrust-assisted swing datum.

2. The dynamic pendulum thrust measurement system as claimed in claim 1, wherein in the thrust set swing step, the thruster is started to provide the thrust when the positioning point of the pendulum structure is located at at least one starting height during the reciprocating swing process, wherein the starting height is the release height, or the starting height is any position of the positioning point of the pendulum structure during the reciprocating swing process, wherein the starting height is higher than, equal to or lower than the release height.

3. The dynamic pendulum thrust measurement system as claimed in claim 1, wherein at least one starting height at which the thruster provides the thrust is conducive to make the thrust-assisted swing datum of the thrust-assisted pendulum motion of the pendulum structure greater than the thrustless-assisted swing datum of the thrustless-assisted pendulum motion.

4. The dynamic pendulum thrust measurement system as claimed in claim 1, wherein a force application direction of the thrust is conducive to make the thrust-assisted swing datum of the thrust-assisted pendulum motion of the pendulum structure greater than the thrustless-assisted swing datum of the thrustless-assisted pendulum motion.

5. The dynamic pendulum thrust measurement system as claimed in claim 1, wherein the preset number of times of swing is once or a plurality of times, the preset number of times of start is once or a plurality of times, and/or the preset start state provides the thrust in a pulsed, a continuous or an intermittent manner.

6. The dynamic pendulum thrust measurement system as claimed in claim 1, wherein the driving device comprises an arc-shaped rack, a semi-gear and a rotating element, the arc-shaped rack is disposed on the swing end of the swing arm, the semi-gear comprises a gear surface and a gearless surface, wherein the gear surface of the semi-gear meshes with the arc-shaped rack, so that the semi-gear is rotated through the rotating element to raise the positioning point of the pendulum structure to the release height, wherein the gearless surface of the semi-gear is configured to not engage with the arc-shaped rack, thereby automatically releasing the swing end of the pendulum structure to cause the pendulum structure to fall under the action of gravity to perform the reciprocating swing process of the preset number of times of swing.

7. The dynamic pendulum thrust measurement system as claimed in claim 1, wherein the thrustless-assisted swing datum is selected from one or more than one of a group consisting of a swing height, a swing angle, a swing amplitude and a swing frequency of the pendulum structure in the thrustless-assisted pendulum motion, and the thrust-assisted swing datum is selected from one or more than one of a group consisting of a swing height, a swing angle, a swing amplitude and a swing frequency of the pendulum structure in the thrust-assisted pendulum motion.

8. The dynamic pendulum thrust measurement system as claimed in claim 1, wherein the thruster is a pulsed plasma thruster, a micro gas thruster or a micro thrust generating device.

9. The dynamic pendulum thrust measurement system as claimed in claim 1, further comprising a vacuum environment used for enabling the thruster to provide the thrust in the vacuum environment, or enabling the pendulum structure to perform the reciprocating swing process in the vacuum environment.

10. The dynamic pendulum thrust measurement system as claimed in claim 1, wherein the thruster is started at any position in a forward path of the pendulum structure performing the reciprocating swing process, and/or the thruster is closed at any position in the forward path of the pendulum structure performing the reciprocating swing process.

11. The dynamic pendulum thrust measurement system as claimed in claim 1, wherein the thruster provides the thrust in a single time in a forward path of the single reciprocating swing process in a pulsed, a continuous or an interval manner.

12. The dynamic pendulum thrust measurement system as claimed in claim 1, wherein the thruster provides the thrust multiple times in a forward path of the single reciprocating swing process in a pulsed or an intermittent manner.

13. The dynamic pendulum thrust measurement system as claimed in claim 1, wherein the thruster only performs work on the pendulum structure when the pendulum structure is provided with the energy, wherein the energy is a potential energy and/or a kinetic energy.

14. The dynamic pendulum thrust measurement system as claimed in claim 1, wherein the pendulum structure is a single pendulum structure.

15. The dynamic pendulum thrust measurement system as claimed in claim 1, wherein in the thrust set swing step, the thruster is started to provide the thrust to the pendulum structure such that the energy provided to the pendulum structure is accumulated during the reciprocating swing process.

16. A dynamic pendulum thrust measurement method for measuring a thrust provided by a thruster using a dynamic pendulum thrust measurement system, the thruster being disposed on a swing arm to form a pendulum structure, comprising following steps of:

performing a non-thrust set swing step for raising a positioning point on the pendulum structure to a release height, and then causing a swing end of the pendulum structure to fall under an action of gravity for performing a reciprocating swing process of a preset number of times of swing, wherein the thruster is in a closed state when the pendulum structure performs the reciprocating swing process, so that the pendulum structure performs a thrustless-assisted pendulum motion during the reciprocating swing process;

performing a thrust set swing step for raising the positioning point on the pendulum structure to the release height, and then causing the swing end of the pendulum structure to fall under the action of gravity for performing the reciprocating swing process of the preset number of times of swing, wherein when the pendulum structure performs the reciprocating swing process and is provided with an energy, the thruster is started according to a preset number of times of start and a preset start state and correspondingly provides the thrust respectively, so that the pendulum structure performs a thrust-assisted pendulum motion during the reciprocating swing process; and performing an operation step used for calculating the thrust provided by the thruster based on a difference between a thrustless-assisted swing datum of the thrustless-assisted pendulum motion and a thrust-assisted swing datum of the thrust-assisted pendulum motion.

* * * * *